United States Patent

Miles et al.

[15] 3,640,132
[45] Feb. 8, 1972

[54] TIRE UNIFORMITY TESTER

[72] Inventors: Edwin R. Miles, Huntsville; Donald E. Dreier, Brownsville, both of Ala.

[73] Assignee: Northrop Corporation, Beverly Hills, Calif.

[22] Filed: June 22, 1970

[21] Appl. No.: 48,299

[52] U.S. Cl. ............................................................. 73/146
[51] Int. Cl. ..................................................... G01m 17/02
[58] Field of Search ........................ 73/146, 457, 78; 33/203

[56] References Cited

UNITED STATES PATENTS

| | | | |
|---|---|---|---|
| 2,709,362 | 5/1955 | Marcus et al. | 73/117 X |
| 1,489,434 | 4/1924 | Harvey | 73/117 |
| 2,363,316 | 11/1944 | Hagg | 73/457 |

*Primary Examiner*—Donald O. Woodiel
*Attorney*—William W. Rundle and Willard M. Graham

[57] ABSTRACT

This machine tests the stiffness uniformity of a pneumatic tire body by rotating it while in place on a vehicle and resting on the tester, and recording vertical tire deflections (weak spots or hard spots) on a chart. The tester has a base frame with drive roller, an adapter carried by the tire wheel at its rim and holding a chart, a motion pickup linkage in touch with an axle of the adapter, and a scribe actuated by the linkage and bearing against the chart.

10 Claims, 7 Drawing Figures

INVENTORS:
Edwin R. Miles
Donald E. Dreier

By William W. Rundle
    AGENT

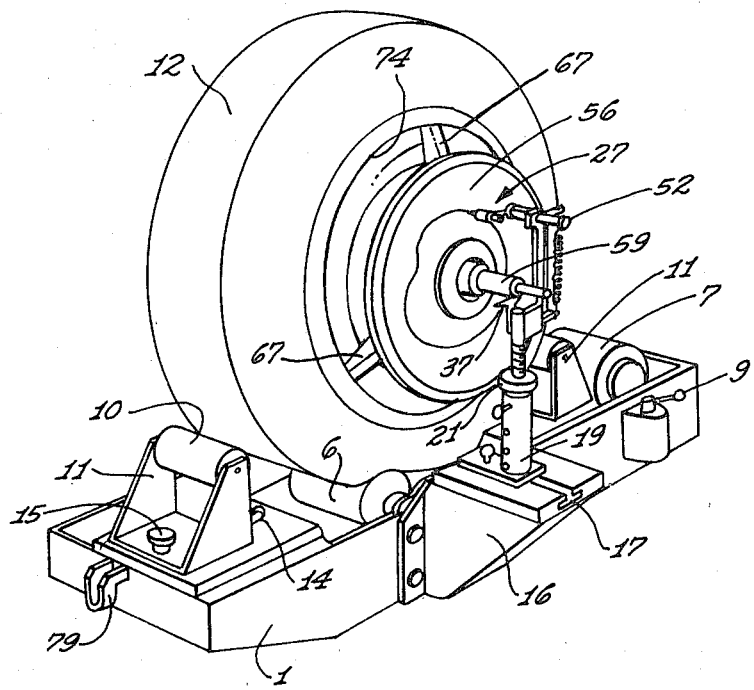
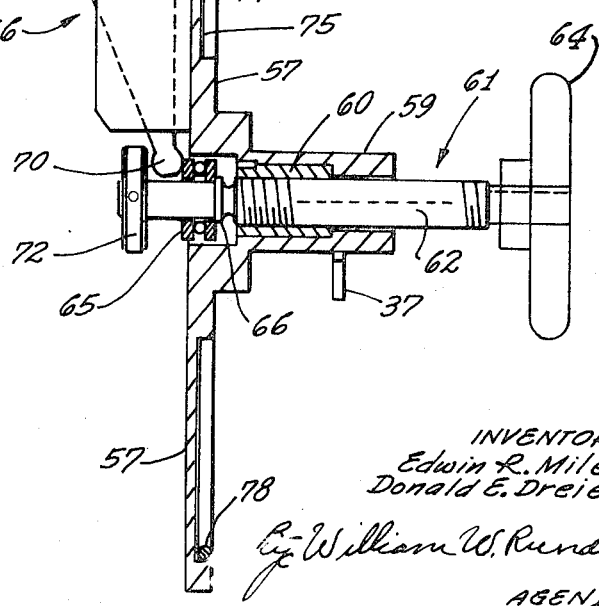

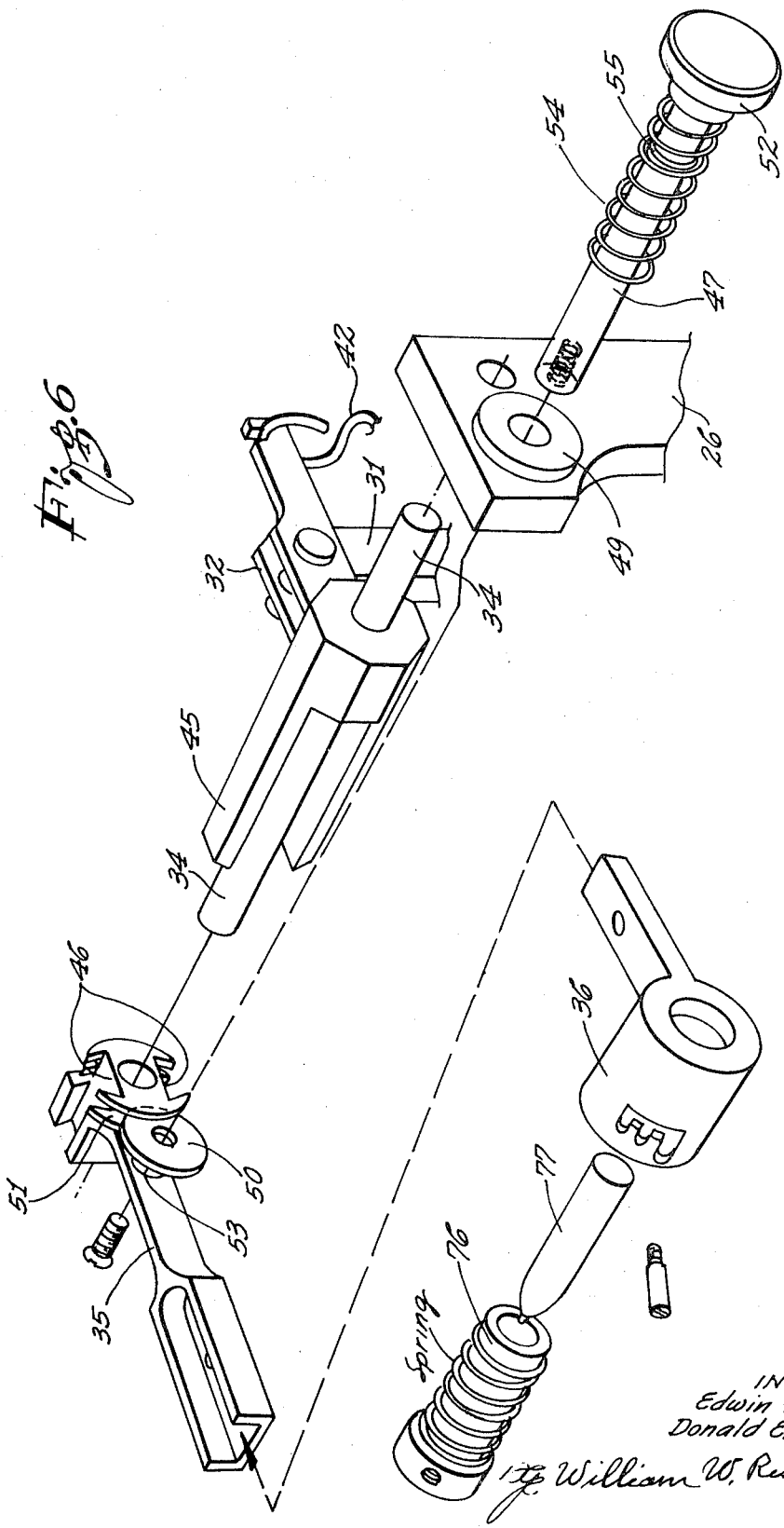

TIRE UNIFORMITY TESTER

The present invention relates to testing machines, and more particularly, to a tire tester for the pneumatic tires of road vehicles.

In the age of the high speed automobile with the adoption of wide oval and bias-belted tires, a new problem of vibration has arisen. It has been found that in addition to faults of tire balance and out-of-roundness, a condition of varying stiffness or strength of the tire carcass causes complaints of a bumpy ride and associated troubles. This is due to nonuniformities of the carcass material. No existing tester or technique can measure or indicate this specific factor of stiffness variation, without going to a large, complex and expensive machine involving a very sensitive force-measuring wheel and attached computer.

It is therefore an object of the present invention to provide means for testing a tire to determine if its carcass has a nonuniform stiffness somewhere around the tire.

A further object of this invention is to provide a tester for tire stiffness variation which indicates the amount and position of such variation.

Still further objects are to provide a tire stiffness tester which is accurate, moderately priced, convenient to use in the shop, and incorporates a separate portable record for each tire tested.

Briefly, our invention comprises a base frame having a drive roller and support rollers, an adapter mountable on the wheel of the tire to be tested and carrying a removable record chart, and a motion pickup linkage supported from the frame. A center shaft of the adapter contacts a linkage actuator and moves the latter in the vertical direction when tire irregularities are encountered, and an output member of the linkage drives a marking member which records the results on the chart. In particular, there is only a single drive roller which supports the bottom center of the tire, and two idler rollers which maintain the tire so centered on the drive roller.

The invention will be more clearly understood by reference to the following detailed description of a preferred embodiment, and to the accompanying drawings illustrative thereof.

In the drawings,

FIG. 3 is a perspective view of the tester assembly and tire, showing the motion pickup linkage.

FIG. 6 is an exploded perspective view of the upper linkage elements, showing details of a pen-lifting structure.

FIG. 7 is an enlarged end elevation view of the wheel adapter, mostly in vertical section, viewed as indicated in FIG. 2.

Figure 1:
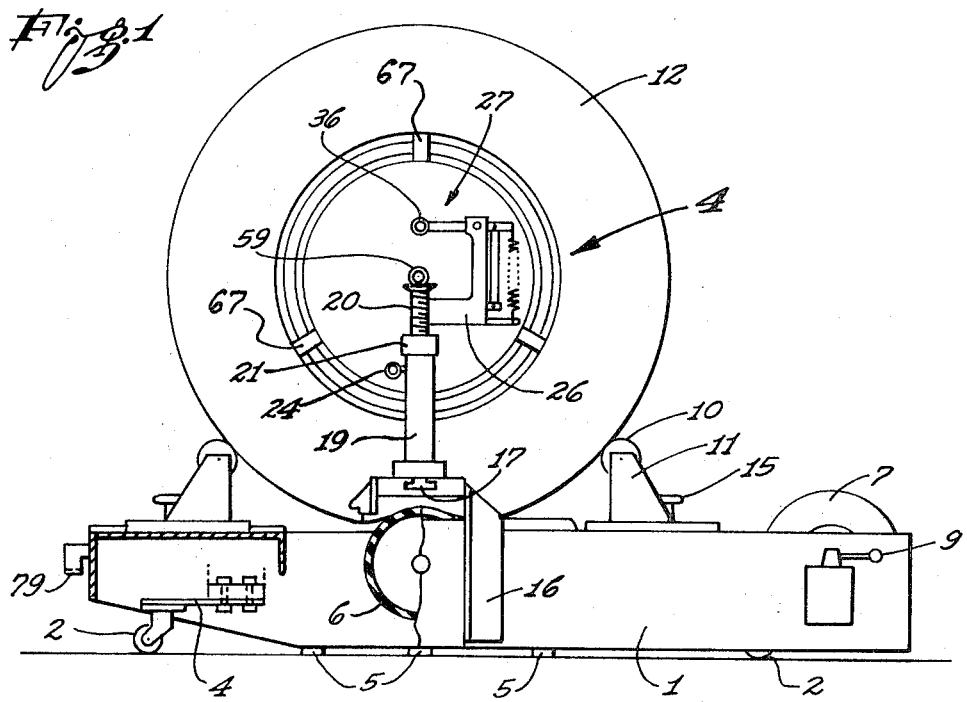
FIG. 1 is a side view of a typical tire and wheel resting on a tester assembly of the present invention, showing a portion of the base cut away.
Figure 2:
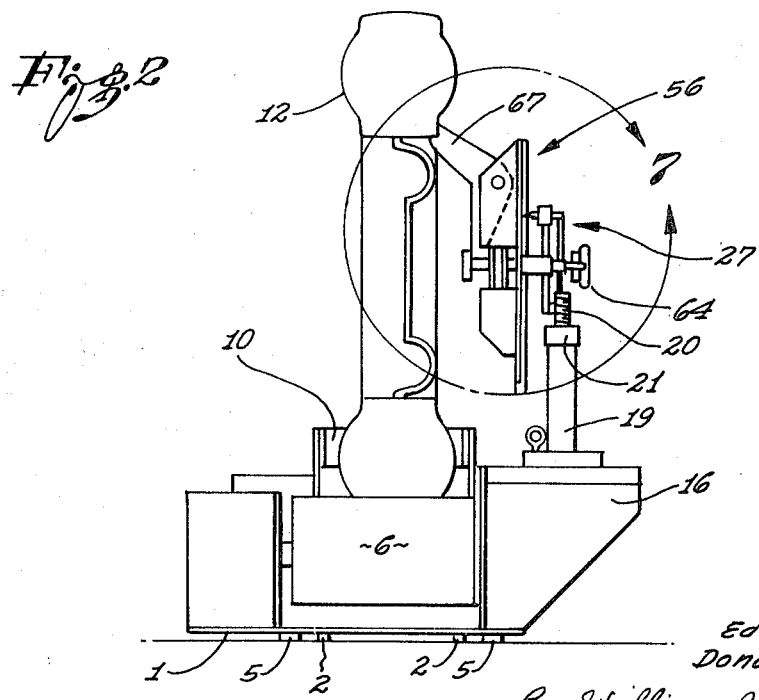
FIG. 2 is a left end view of the assembly of FIG. 1, showing the wheel and tire in vertical section at the center.

Referring first to FIGS. 1, 2 and 3 for a detailed description of a preferred embodiment, a base frame 1 of welded metal construction normally rolls on four casters 2. Each caster 2 is mounted through a leaf spring 4 which is bolted to the frame 1 at the end opposite the caster. When an automobile is jacked up at one wheel and then lowered to rest on the tester, the springs 4 deflect and the frame 1 rests solidly on the floor at three integral rest pads 5.

A cylindrical drive roller 6 belt-driven by an electric motor 7 is mounted in the frame 1, with an on-off-reverse switch 9 provided for the motor 7. Two cylindrical idler rollers 10 are mounted in adjustable brackets 11 on either side of the drive roller 6 and are positioned higher than the drive roller 6 to bear against each side of a vehicle tire 12 when the latter is in test position. Frame slots 14 and clamp screws 15 permit linear adjustment of the idler rollers 10 to and away from the tire 12.

A side bracket 16 on the frame 1 near the drive roller 6 carries a T-slot 17 extending laterally in its upper surface approximately in a line parallel to the extended axis of the drive roller 6. In this T-slot rides a vertical support assembly comprising a housing 19, threaded post 20, and knurled vertical adjusting nut 21. As further shown in FIG. 4, a gib nut 22 retains the adjusting nut 21 in vertical position but allows it to rotate when turned by hand. Also, an alignment screw 24 has its inner end fitting into a vertical slot 25 extending along the threaded post 20, which prevents the post from revolving. At the upper end of post 20, an angled mounting arm 26 is welded to the side thereof, and this arm 26 supports a motion pickup linkage 27.

Figure 5:
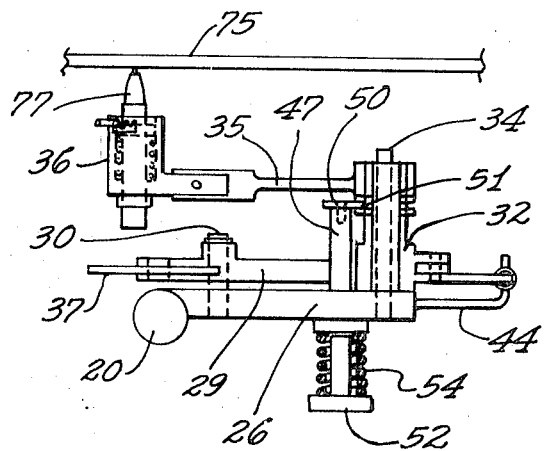
FIG. 5 is a top view of the linkage of FIG. 4.

The motion pickup linkage 27, further shown in FIG. 5, comprises three main link elements. A lower link 29 is pivotally connected to arm 26 by a first pin 30, a vertical link 31 is pivotally connected to the right-hand end of the lower link 29, and an upper link including a short upper link 32 is pivotally connected to the vertical link 31 and pivotally supported on the arm 26 by a second pin 34. A long upper link 35, acting as a solid extension of the short upper link 32, carries a scribe holder 36 at its outer end.

A T-bar 37 is pivotally connected to the left end of the lower link 29, and its motion is maintained in a vertical attitude by a short horizontal link 39 pivotally connected at its left end to the T-bar 37 and pivotally supported at its right end by a third pin 40 supported by the arm 26. The upper crossarm of the T-bar 37 is a relatively long straight edge 41 which forms the input element of the pickup linkage, as will be described further in connection with additional apparatus. A tension spring 42 is connected between the short upper link 32 and an arm-mounted hook 44, to bias the T-bar in the upward direction.

As further shown in FIG. 6, the short upper link 32 includes a lengthy bifurcated portion 45 extending coaxially with the second pin 34, which portion mates with a pair of channels 46 in the long upper link 35, so that link 35 slides in and out along pin 34. Thus the long and the short upper links 35 and 32 are relatively movable along their common pivot axis but are solidly connected in the rocking direction about this axis defined by the second pin 34.

A plunger 47 extends through a bushing 49 in the arm 26 parallel to the second pin 34. A disc 50 is screw-attached to the rear end of the plunger 47 and a portion of the edge of disc 50 fits into a circumferential groove 51 formed in the side of long upper link 35 facing the arm 26, as shown. An access hole 53 is provided in long upper link 35 for attachment of disc 50 to plunger 47. A knob 52 is provided on the forward end of plunger 47, and a light compression spring 54 surrounds the plunger 47 behind the knob 52. A snapring 55 on plunger 47 determines the limit of travel when the plunger 47 is pushed in against the spring force. It will now be evident that the long upper link 35 and the scribe holder 36 are normally spring-retracted along second pin 34 by the plunger disc 50 without interfering with the linkage actions responsive to vertical motions of the T-bar 37.

Figure 4:
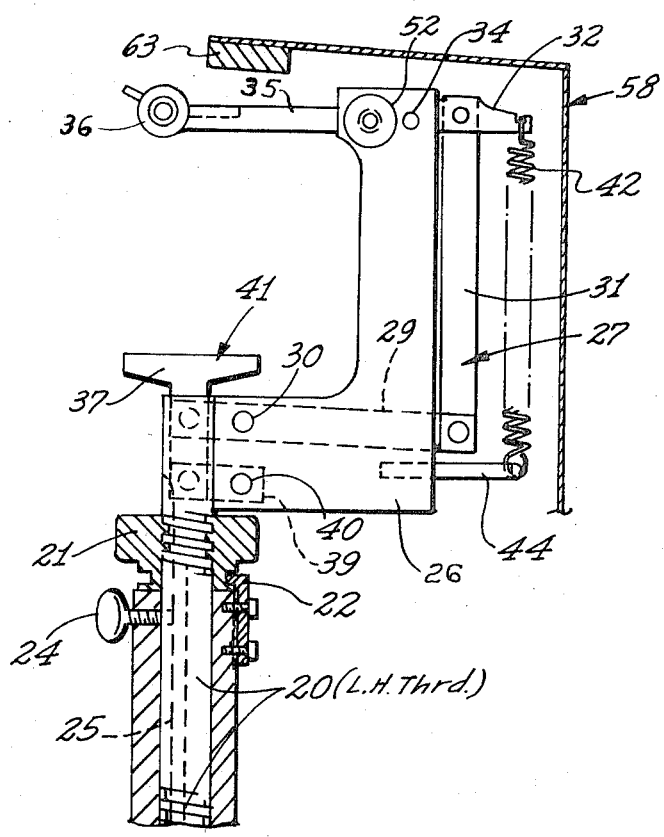
FIG. 4 is an enlarged side elevation view of the linkage, viewed as indicated in FIG. 1.

A protective linkage cover 58, partially shown in FIG. 4, may be removably attached to the mounting arm 26 to surround the top, side, and bottom linkage elements which might otherwise be damaged by articles dropped or bumping into them. A cushion 63 attached to the underside of the top face of this cover 58 limits the upward travel of the linkage when the T-bar 37 is not resting against the hub 59.

The remainder of the tester comprises a wheel adapter assembly 56 shown in FIGS. 1 through 3 with further details in FIG. 7. A large circular plate 57 has a central hub 59 containing a pressed in insert 60 which is internally threaded. A shaft 61 has a relatively long threaded portion 62 which mates with the threaded insert 60. A removable hand wheel 64 is keyed to the outer end of shaft 61. A thrust bearing 65 resting against a shaft shoulder 66 is slipped on the other shaft end.

Three adapter locking levers 67 are pivotally mounted in side strips 69 fixed to the rear of large plate 57. The inner ends of these levers 67 terminate in enlarged rounded heads 70, and the outer ends each carry a hardened cone 71. The heads 70 bear against thrust bearing 65, and a retaining collar 72 is pinned to the inner shaft end. The pointed cones 71 fit against the inner circumference of a wheel rim 74 on which the tire 12 to be tested is mounted, and thus hold the wheel adapter assembly to the wheel during a test.

The outer face of plate 57 is recessed to hold a paper chart 75 of a circular shape, on which is traced a record of the tire test.

In the scribe holder 36, a spring-loaded scribe bushing 76 (FIG. 6) is loosely fitted, and the scribe 77 itself may be a marker pen or any suitable type of marking instrument.

In operation, the wheel adapter assembly 56 is installed onto the wheel rim 74 of the tire to be tested, with the wheel mounted on the car. This is done by turning the hand wheel 64 clockwise until the cones 71 grip the rim 74. The length of threaded portion 62 on shaft 61 is sufficient to adjust for automobile wheels of 13 to 15 inches in diameter for example. A new polar chart 75 is placed in the adapter plate recess with its reference mark toward the valve stem of the tire. It is secured by a circular spring 78, as shown in FIG. 7. The base frame 1 is rolled under the jacked-up wheel, preferably from the side of the wheel. A towing lug 79 may be provided at either end or side of the frame 1 for attachment of a towing handle (not shown). When the drive roller 6 is centered under the wheel, the car is let down on it, and the two idler rollers 10 are adjusted to contact the tire 12. If the idler rollers 10 are properly set for the size of tire beforehand, the tester will be automatically centered longitudinally of the car by the idler rollers when the wheel is lowered, since the spring-mounted casters 2 will allow the tester to shift position before the car weight is sufficient to press down the frame onto the rest pads 5.

The vertical housing 19 is loosened in the T-slot 17, and adjusted laterally until the scribe 77 is within its adjustment distance from the chart 75. Hub 59 is made long enough to extend out over the T-bar 37 when the scribe is properly positioned. The housing 19 is now clamped tight, and the vertical adjusting nut 21 is turned as necessary to cause the T-bar edge 41 to be forced against the hub 59 until the scribe 77 is positioned over a zero or reference circular line on the chart.

The plunger knob 52 is pressed in to see if the scribe 77 coincides with the reference line on the chart. If not, the vertical adjusting nut 21 should be adjusted further until the scribe does rest on the reference line. The knob 52 is released to retract the scribe 77, and the motor 7 is now started to rotate the wheel and tire 12.

The motor speed and the drivebelt pulley diameters are designed to spin the tire 12 at a desired rate, preferably about 95 revolutions per minute or approximately corresponding to 7 miles per hour car speed. This speed is high enough to avoid initial rolling friction and low enough to avoid vibration problems.

When a steady state of tire rotation has been reached, the plunger knob 52 is pushed in to bring the scribe 77 against the recording chart 75. It is held there for one or maybe two tire revolutions and then released to retract the scribe.

When the chart 75 is examined, any hard tire spots or weak spots in the carcass will appear as humps or dips in the otherwise circular marker trace. The position of the hump or dip will indicate that the tire irregularity is diametrically opposite the chart blip since the scribe 77 is positioned substantially straight above the central hub 59.

The linkage may be designed to have a motion multiplication of about 20 to 1 from the vertical motion of the scribe 77 to the vertical motion of the T-bar 37. Experience has shown that a deviation from the norm in either direction in excess of 0.03 inch indicates grounds for replacement of a passenger car tire. The chart 75 preferably carries calibrated circles (not shown) which are used to determine the magnitude of variation.

The present tire uniformity tester incorporates the most advantageous features from the standpoint of accuracy. The single drive roller 6 is better than two drive rollers for example. The single drive roller introduces a single isolated impulse into the sensing mechanism that results in a true chart reading. This is in contrast to a double roller system that introduces two simultaneous impulses that appear as a composite on the chart and is not a true depiction. For instance in the two-roller approach, one roller could be rolling over a stiff section of the tire carcass while simultaneously the other roller is rolling over a soft section. The two simultaneous actions would have a cancelling effect and produce erroneous results.

Further, a motion pickup source located on the rim as disclosed herein (for motion pickup) is better than at other places, for instance the wheel axle centerline. Actually the axle centerline is the point where the maximum accumulation of error-producing wheel tolerances occur. These include such error sources as tolerance on the wheel bolt hole circle position, the bolt circle in the wheel drum, bearing seats, bearings and the like. At the center of the wheel, these tolerance errors appear not in single amplitude but double amplitude.

Thus it is seen that the present invention provides a simple, accurate tire uniformity tester which can advantageously be adopted as an industry standard and be provided for use by every tire factory, tire sales and service shop, automobile dealer's shop, and wheel alignment shop.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A tire tester comprising:
   a. a base frame;
   b. a single power drive roller mounted in said frame and adapted to drive a circular tire and wheel when the tire is resting on said drive roller;
   c. a pair of idler rollers mounted on said frame in position to rest against the tire under test and maintain it centered over said drive roller;
   d. a wheel adapter having adjustable arms adapted to removably fix said adapter to the rim of the tire wheel for rotation therewith;
   e. an axle carried by said wheel adapter along the extended axis of rotation of the wheel and tire;
   f. a support member mounted on said frame and extending upwardly therefrom toward said axle;
   g. a movable linkage pivotally mounted on said support member;
   h. an input member of said linkage bearing against said axle and movable in a vertical direction in response to vertical motions of said axle; and
   i. an output member of said linkage adapted to trace a magnified record of the vertical motions of said input member.

2. Apparatus in accordance with claim 1 including a circular plate incorporated in said wheel adapter and centered on said axle, and chart means mounted on said plate, said linkage output member having a marking instrument adapted to bear against said chart and trace a record thereon as the wheel and tire are rotated.

3. Apparatus in accordance with claim 1 wherein said support member is adjustable both toward and away from the tire and up and down.

4. Apparatus in accordance with claim 1 wherein said linkage comprises a three-bar linkage operating in a vertical plane, said linkage including a lower link having a pivotal mounting connection to said support member, said input member having a substantially horizontal upper edge and connected near one end of said lower link, a vertical link pivotally connected near the opposite end of said lower link, and an upper link having a pivotal mounting connection to said support member, said upper link being pivotally connected at one end to said vertical link, and said output member being connected at the opposite end of said upper link.

5. Apparatus in accordance with claim 1 wherein said linkage comprises a three-bar linkage operating in a vertical plane, and including manually operable output member shifting means for moving said output member between an extended record tracing position and a retracted position independent of said input member and independent of pickup motion of said linkage.

6. Apparatus in accordance with claim 5 including elastic means normally urging said output member to said retracted position.

7. Apparatus in accordance with claim 1 including rolling means on said base frame, said rolling means being spring-loaded to support said tire tester alone, and being vertically movable against the spring load under the weight of a tire and wheel on a vehicle, whereby said base frame can rest solidly on the floor in operating position.

8. Apparatus in accordance with claim 1 including three rigid rest pads on the lower side of said base frame, and a plurality of casters elastically mounted from the bottom of said base frame, whereby said tester can be rolled to an operating position and solidly supported by said rest pads during operation with additional weight thereon.

9. In a tire tester or the like having a base frame for resting on the floor under a tire to be tested, with the tire mounted on a loaded wheel: the combination comprising a single support roller rotatably mounted in said frame and adapted to support said tire and wheel directly on top of said roller; and motion pickup means including first means secured to said frame, second means adapted to be secured directly to the rim of the wheel and having an axle fixed to said second means and positioned along the extended axis of rotation of the wheel, and movable means for measuring and indicating relative vertical motions between said first means and said axle when said tire and wheel are rotating, due to variations in tire strength at any position therearound.

10. Apparatus in accordance with claim 13 including driving means connected to said roller whereby said roller frictionally rotates said tire.

* * * * *

UNITED STATES PATENT OFFICE
CERTIFICATE OF CORRECTION

Patent No. 3,640,132　　　　　　　　Dated February 8, 1972

Inventor(s) Edwin R. Miles, et al

It is certified that error appears in the above-identified patent and that said Letters Patent are hereby corrected as shown below:

Column 6, line 18, "13" should read -- 9 -- .

Signed and sealed this 31st day of October 1972.

(SEAL)
Attest:

EDWARD M. FLETCHER, JR.　　　　　　ROBERT GOTTSCHALK
Attesting Officer　　　　　　　　　Commissioner of Patents